US011108497B2

(12) United States Patent
Vankayala et al.

(10) Patent No.: US 11,108,497 B2
(45) Date of Patent: Aug. 31, 2021

(54) METHOD AND SYSTEM FOR HIERARCHICAL DECODING OF DATA PACKETS IN CELLULAR COMMUNICATION SYSTEM

(71) Applicant: SAMSUNG ELECTRONICS CO., LTD., Suwon-si (KR)

(72) Inventors: Satya Kumar Vankayala, Bangalore (IN); RaviTeja Gundeti, Bangalore (IN); Abhay Kumar Sah, Bangalore (IN); Ashvin Kaithara Joseph, Bangalore (IN); Seungil Yoon, Suwon-si (KR); Anshuman Nigam, Bangalore (IN); Satya Venkata Uma Kishore Godavarti, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/078,922

(22) Filed: Oct. 23, 2020

(65) Prior Publication Data

US 2021/0126738 A1    Apr. 29, 2021

(30) Foreign Application Priority Data

Oct. 24, 2019   (IN) .............................. 201941043247
Oct. 20, 2020   (IN) .............................. 201941043247

(51) Int. Cl.
*H04L 1/00*     (2006.01)
*H04B 17/336*   (2015.01)
(Continued)

(52) U.S. Cl.
CPC .......... *H04L 1/0054* (2013.01); *H04B 17/336* (2015.01); *H04L 69/324* (2013.01); *H04W 88/08* (2013.01)

(58) Field of Classification Search
CPC .... H04W 88/08; H04B 17/336; H04L 1/0057; H04L 1/0058; H04L 1/0054; H04L 69/324
(Continued)

(56) References Cited

U.S. PATENT DOCUMENTS 8,238,487 B2   8/2012  Lou et al.
8,761,316 B2   6/2014  Challa et al.
(Continued)

FOREIGN PATENT DOCUMENTS

KR   10-1559344 B1   10/2015

OTHER PUBLICATIONS

International Search Report (PCT/ISA/210) dated Jan. 29, 2021 issued by the International Searching Authority in International Application No. PCT/KR2020/014602.
(Continued)

*Primary Examiner* — Emmanuel Bayard
(74) *Attorney, Agent, or Firm* — Sughrue Mion, PLLC

(57)  ABSTRACT

Disclosed herein is method and system for hierarchical decoding of data packets in cellular communication network. At first, base station upon receiving data packets computes LLR values and evaluates computed LLR values through first Cyclic Redundancy Check (CRC) to determine successful decoding of data packets. When first CRC is unsuccessful and when SINR is greater than first predefined threshold, base station combines LLR values of intra base stations with computed LLR values for decoding data packets and performs second CRC check to determine if data packets are successfully decoded. The base station combines LLR values of intra base stations and LLR values of inter base stations with computed LLR values for decoding data packets when SINR value of inter base stations is greater than second predefined threshold and when evaluated sec- (Continued)

ond CRC is unsuccessful and performs third CRC. The present disclosure increases throughput and reduces latency significantly while decoding packets.

20 Claims, 11 Drawing Sheets

(51) Int. Cl.
*H04L 29/08* (2006.01)
*H04W 88/08* (2009.01)

(58) Field of Classification Search
USPC .......................................... 375/340, 341, 219
See application file for complete search history.

(56) References Cited

U.S. PATENT DOCUMENTS

| | | | | |
|---|---|---|---|---|
| 10,999,017 B2* | 5/2021 | Sun | ........................ | H04L 1/1896 |
| 10,999,874 B2* | 5/2021 | Akkarakaran | .... | H04W 72/0413 |
| 2009/0037797 A1* | 2/2009 | Spencer | ............ | H03M 13/6362 |
| | | | | 714/790 |
| 2014/0051471 A1 | 2/2014 | Comeau | | |
| 2014/0126507 A1* | 5/2014 | Takahashi | ................. | H04L 1/08 |
| | | | | 370/329 |
| 2014/0241269 A1 | 8/2014 | Smee et al. | | |
| 2016/0119105 A1 | 4/2016 | Jiang et al. | | |
| 2017/0170991 A1 | 6/2017 | Scholand et al. | | |
| 2017/0222754 A1 | 8/2017 | Noh et al. | | |

OTHER PUBLICATIONS

Shirish Nagaraj et al., "Multi-cell Distributed Interference Cancellation for Co-operative Pico-cell Clusters", Globecom 2012—Wireless Communications Symposium, IEEE, Dec. 3-7, 2012, pp. 4193-4199, 7 pages total.

Vishnu OC et al., "Joint Uplink LLR Computation, Quantization, and Combining for Load-Balanced Small Cells", IEEE, Dec. 4-8, 2016, 6 pages total.

* cited by examiner

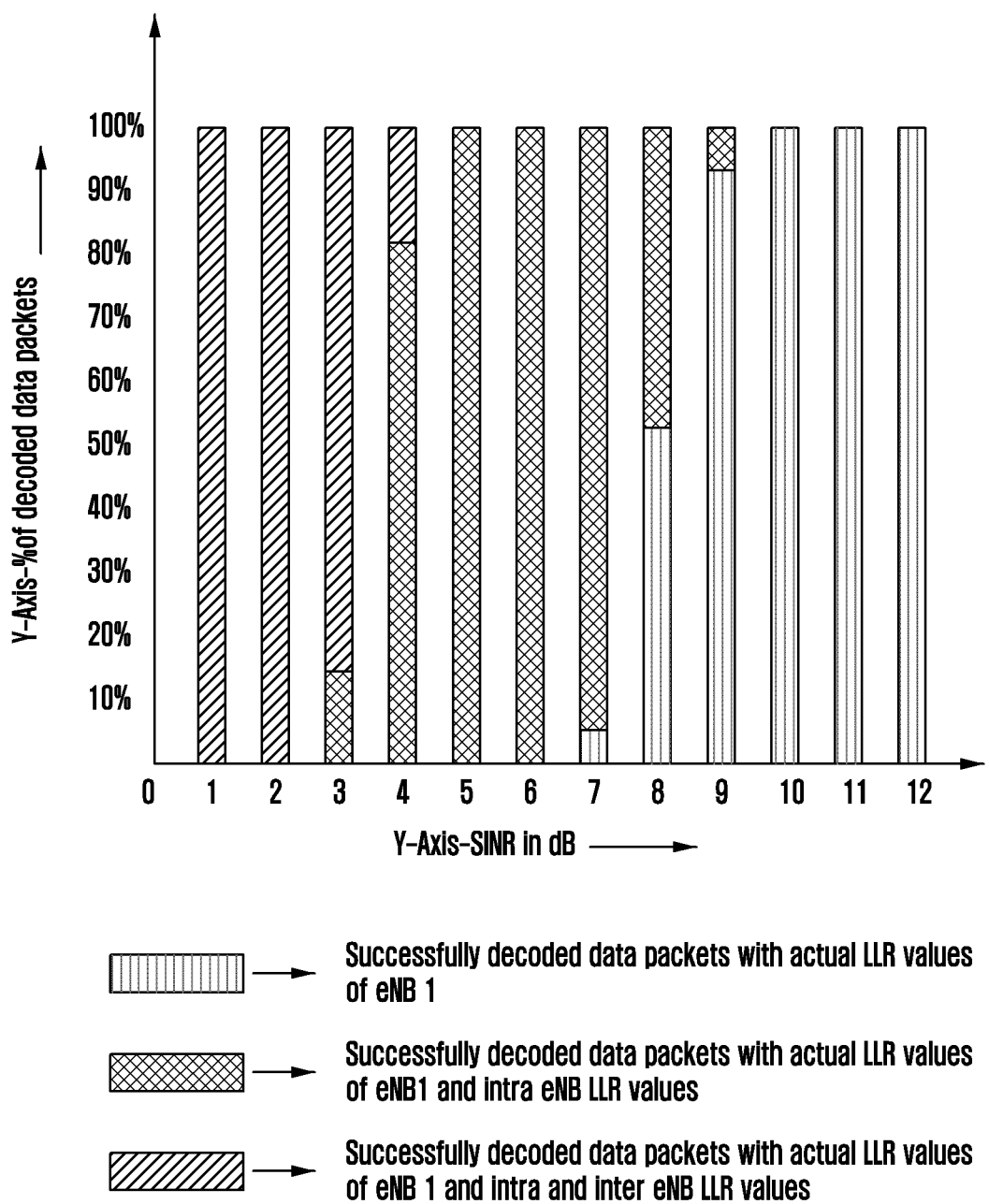

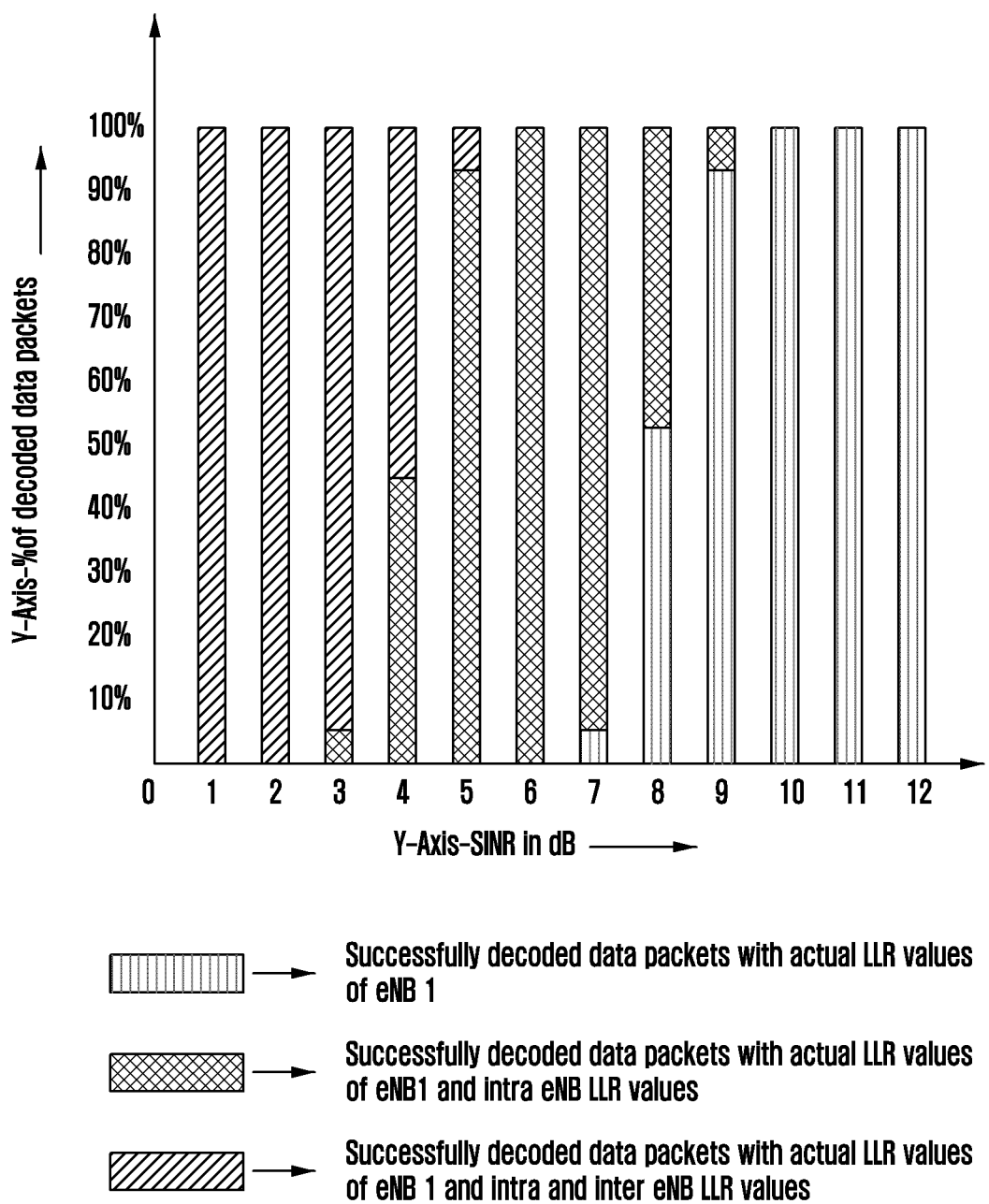

METHOD AND SYSTEM FOR HIERARCHICAL DECODING OF DATA PACKETS IN CELLULAR COMMUNICATION SYSTEM

CROSS-REFERENCE TO RELATED APPLICATION(S)

This application is based on and claims priority under 35 U.S.C. § 119 to Indian Provisional Patent Application No. 201941043247 filed on Oct. 24, 2019, and Indian Non-Provisional Patent Application No. 201941043247 filed on Oct. 20, 2020, in the Indian Intellectual Property Office, the disclosure of which are incorporated by reference herein in their entireties.

TECHNICAL FIELD

The present subject matter is, in general, related to communication network, but not exclusively, to a method and a system for hierarchical decoding of one or more data packets in a cellular communication system.

BACKGROUND

Wireless communication systems is an important mean by which people worldwide communicate. The wireless communication system may provide communication for a number of mobile stations, each of which may be serviced by a base station. As used herein, the term "mobile station" refers to an electronic device that may be used for voice and/or data communication over the wireless communication system. The term "base station" refers to a wireless communication station that is installed at a fixed location and used to communicate with mobile stations. The mobile station may communicate with one or more base stations via transmissions on the uplink and the downlink. The uplink (or reverse link) refers to the communication link from the mobile station to the base station, and the downlink (or forward link) refers to the communication link from the base station to the mobile station. Each base station may include one or more cells.

In cellular communication, inter cell interference has been a major concern. The intra and/or inter cell interference may be used interchangeably. In second generation communication, the operators divided the allocated bandwidth and cells in the vicinity use different frequency to operate which is known as frequency re-use. But with the evolution of communication, the need for data increased and hence operators had to allocate more resources to users or provide them with more bandwidth. To overcome this, a frequency reuse factor-1 is used in 4G wherein all cells uses same frequency. As a result, the cells may face inter cell interference. To overcome this Coordinated Multipoint Processing (CoMP) technique is implemented which improves user experience by exchanging cell information among different base stations. The CoMP transmission technique increases throughput of the system. There are two types of CoMP. They are intra site coordinated multipoint and inter site coordinated multipoint. In intra site coordinated multipoint, significant amount of information may be exchanged since communication is within the cells of same eNB and hence does not involve backhaul in the network. The inter site coordinated multipoint involves coordination of multiple eNBs and hence puts additional burden on the backhaul as lot of information is exchanged and due to backhaul delay in packet decoding increases which in turn increases latency. In order to overcome the backhaul and the signaling delay associated with CoMP, the existing techniques in uplink communication, computes Log Likelihood Ratio (LLR) value of the base station and waits for intra eNB and inter eNB LLR values to decode packet information received from the mobile station. So, in the existing techniques, only after receiving the intra and inter LLR values, the packet decoding starts which creates delay and increases latency. Also, the intra and inter cell interference may reduce system throughput.

The information disclosed in this background of the disclosure section is only for enhancement of understanding of the general background of the disclosure and should not be taken as an acknowledgment or any form of suggestion that this information forms the prior art already known to a person skilled in the art.

SUMMARY

The present disclosure relates to a method of hierarchical decoding of one or more data packets in a cellular communication system. The method comprises computing, by a base station in the cellular communication system, Log Likelihood Ratio (LLR) values for decoding one or more data packets received from a User Equipment (UE) in the cellular communication system. Thereafter, the base station evaluates the computed LLR values through a first Cyclic Redundancy Check (CRC) to determine whether the one or more data packets are successfully decoded. Then the base station combines LLR values of one or more intra base stations, associated with the base station, with the computed LLR values for decoding the one or more data packets when at least one of Signal-to-Interference-plus-Noise Ratio (SINR) value of each of the one or more intra base stations is greater than a first predefined threshold and when the evaluated first CRC is unsuccessful. The base station determines whether the one or more data packets are successfully decoded using the LLR values of the one or more intra base stations and the computed LLR values by evaluating through a second CRC. Thereafter, the base station combines the LLR values of one or more intra base stations and LLR values of one or more inter base stations, associated with the base station, with the computed LLR values for decoding the one or more packets when at least one of SINR value of each of the one or more inter base stations is greater than a second predefined threshold and when the evaluated second CRC is unsuccessful. The base station determines whether the one or more packets are successfully decoded using the LLR values of the one or more intra base stations, LLR values of the one or more inter base stations and the computed LLR values by evaluating through a third CRC. When the one or more packets are not decoded successfully, the base station receives redundant version of the one or more data packets from the UE for decoding when the evaluated third CRC is unsuccessful.

Further, the present disclosure relates to a system for hierarchical decoding of one or more data packets in a cellular communication system. The system comprises one or more User Equipments (UE), one or more base stations. Each of the one or more base stations is configured to compute Log Likelihood Ratio (LLR) values for decoding one or more data packets received from the UE associated with the base station and evaluate the computed LLR values through a first Cyclic Redundancy Check (CRC) to determine whether the one or more data packets are successfully decoded. Thereafter, each of the one or more base stations combines LLR values of one or more intra base stations, associated with the base station, with the computed LLR values for decoding the one or more data packets when at least one of Signal-to-Interference-plus-Noise Ratio (SINR) value of each of the one or more intra base stations is greater than a first predefined threshold and when the evaluated first CRC is unsuccessful. Once the LLR values of one or more intra base stations are combined with the computed LLR values, each of the one or more base stations are configured to determine whether the one or more data packets are successfully decoded using the LLR values of the one or more intra base stations and the computed LLR values by evaluating through a second CRC. Thereafter, each of the one or more base stations are configured to combine the LLR values of one or more intra base stations and LLR values of one or more inter base stations, associated with the base station, with the computed LLR values for decoding the one or more packets when at least one of SINR value of each of the one or more inter base stations is greater than a second predefined threshold and when the evaluated second CRC is unsuccessful. When the LLR values of one or more intra and inter base stations are combined with the computed LLR values, each of the one or more base stations determine whether the one or more packets are successfully decoded using the LLR values of the one or more intra base stations, LLR values of the one or more inter base stations and the computed LLR values by evaluating through a third CRC. If the one or more packets are not successfully decoded that is when the evaluated third CRC is unsuccessful, then each of the one or more base stations are configured to receive redundant version of the one or more data packets from the UE for decoding.

Further, the present disclosure discloses a method for hierarchical decoding of one or more data packets in a cellular communication system. The method comprises receiving, by a base station in the cellular communication network, one or more data packets from a User Equipment (UE) for decoding the one or more data packets. The method further comprises computing Log Likelihood Ratio (LLR) values for decoding the one or more data packets. Once the LLR values are computed, the method comprises evaluating, by the base station, the computed LLR values through a Cyclic Redundancy Check (CRC). Then the method comprises comparing the LLR values of neighbouring base stations to be greater than a set threshold of SINR, if the CRC is unsuccessful. The computed LLR values of the base station is combined with the LLR value of neighbouring base stations. Thereafter, the method comprises attempting to decode the one or more data packet successfully by passing the CRC.

Further, the present disclosure discloses a system for hierarchical decoding of one or more data packets in a cellular communication system. The system comprises one or more User Equipments (UE) and one or more base stations. Each of the one or more base stations is configured to receive one or more data packets from a User Equipment (UE) for decoding the one or more data packets and compute Log Likelihood Ratio (LLR) values for decoding the one or more data packets. Thereafter, the base station evaluates the computed LLR values through a Cyclic Redundancy Check (CRC). Once the evaluation is performed, the base station compares the LLR values of neighbouring base stations to be greater than a set threshold of SINR, if the CRC is unsuccessful and combines the computed LLR values of the base station with the LLR value of neighbouring base stations. Thereafter, the base station attempts to decode the one or more data packet successfully by passing the CRC, wherein, neighbouring base stations comprise of intra and inter base stations wherein, post failure, the intra base station LLR values are combined with the original base station LLR values, wherein, post the failure of usage of original base station and intra base station LLR values, inter base station LLR values are combined with the original base station and intra base station LLR values wherein set threshold of SINR for both intra and inter base station is different.

Further, the present disclosure discloses a method of hierarchical decoding of one or more data packets in a cellular communication system. The method comprises computing, by a base station in the cellular communication system, pre-SINR values for decoding one or more data packets, received from a User Equipment (UE) in the cellular communication system, received from I/Q samples. Thereafter, the method comprises computing, by the base station, the LLR values of the base station when the pre-SINR is within an expected SINR range. The computed LLR values are evaluated through a Cyclic Redundancy Check (CRC) to determine whether the one or more data packets are successfully decoded. Thereafter, the method comprises performing at least one of, when the pre-SINR is not within the expected SINR range receiving neighboring intra and/or inter base station I/Q samples and combining the intra and/or the inter base station I/Q samples for decoding the one or more data packets by passing through the CRC and receiving neighboring intra and/or inter base station I/Q and/or LLR values and combining the intra and/or the inter base station I/Q and or LLR values for decoding the one or more data packets by passing through the CRC.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIGS. 4a-4b shows a graph illustrating exemplary scenario of how the intra and inter LLR values are used based on SINR value of the base station in accordance with some embodiments of the present disclosure.

Figure 1A:
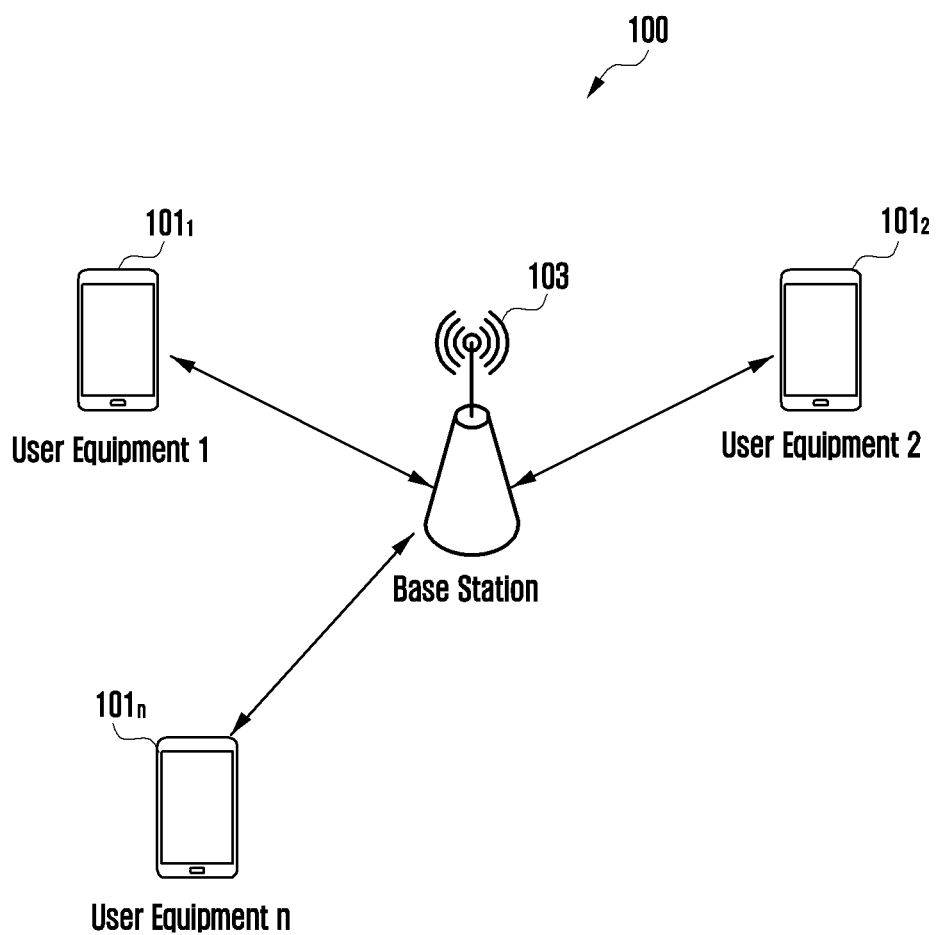
FIGS. 1a-1b illustrates an exemplary environment for hierarchical decoding of one or more data packets in a cellular communication system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a system and method for hierarchical decoding of one or more data packets in a cellular communication system. The system comprises one or more User Equipments (UE) and one or more base stations. Each of the one or more base stations are configured to compute Log Likelihood Ratio (LLR) values for decoding one or more data packets received from the UE associated with the base station. The LLR test assesses the goodness of fit of two competing statistical models based on ratio of their likelihoods. Once the LLR values are computed, the base station may evaluate the computed LLR values through a first Cyclic Redundancy Check (CRC) to determine whether the one or more data packets are successfully decoded. When at least one of the evaluated first CRC is unsuccessful and when Signal to Interference plus Noise Ratio (SINR) value of each of one or more intra base stations is greater than a first predefined threshold, the base station combines the LLR values of one or more intra base stations with the computed LLR values for decoding the one or more data packets. The SINR is a quantity used to provide theoretical upper bounds on channel capacity (or the rate of information transfer) in the communication system. Thereafter, the base station determines whether the one or more data packets are successfully decoded using the LLR values of the one or more intra base stations and the computed LLR values by evaluating through a second CRC. When at least one of the SINR value of each of the one or more inter base stations is greater than a second predefined threshold and when the evaluated second CRC is unsuccessful, the base station combines the LLR values of one or more intra base stations and LLR values of one or more inter base stations, associated with the base station, with the computed LLR values for decoding the one or more packets. Thereafter, the base station determines whether the one or more packets are successfully decoded using the LLR values of the one or more intra base stations, LLR values of the one or more inter base stations and the computed LLR values by evaluating through a third CRC. When the evaluated third CRC is unsuccessful, the base station receives redundant version of the one or more data packets from the UE for decoding the data packets. In an embodiment, I/Q samples may also be combined for decoding one or more data packets. In this manner, the present disclosure proposes a hierarchical method for packet decoding by combining LLR values from intra and inter base station to improve packet decoding which results in lesser bandwidth requirements. Also, the packet decoding latency of the UE will be reduced, thereby improving power efficiency of the UE with the proposed hierarchical decoding of the one or more data packets.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1B:
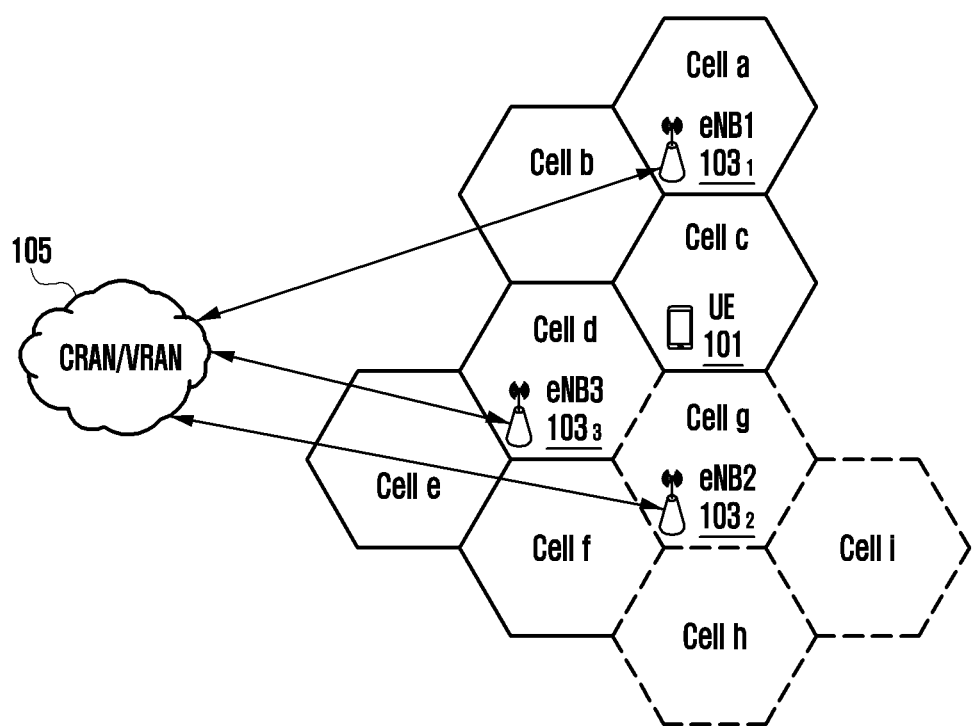

FIGS. 1a-1b shows an exemplary environment for hierarchical decoding of one or more data packets in a cellular communication system in accordance with some embodiments of the present disclosure.

The exemplary environment 100 comprises one or more User Equipments (UE), UE 1 $101_1$ to UE n $101_n$ (Collectively referred as UE 101) and a Base Station (BS) 103. The examples of UE 101 may include, but not limited to, cellular phone, handheld devices, wireless modems, laptop computers, personal computers. The UE 101 may alternatively be referred to as an access terminal, a mobile terminal, a subscriber station, a remote station, a user terminal, a terminal, a subscriber unit, a mobile device, or a wireless device. The base station 103 may alternatively be referred to as an access point, a Node B, or an evolved Node B. Also, the terms BS/cell/eNodeB/gNodeB/Remote Radio Head (RRH)/Radio Unit (RU) may be used interchangeably. For the purpose of illustration, a single BS 103 is shown in the FIG. 1a. However, the cellular communication system may include one or more BS. The present disclosure is applicable for uplink Coordinated Multi Point Processing [COMP] for 4G, 5G or Virtualized Radio Access Network (VRAN) system wherein the system comprises of one or more BS also referred as evolved node B (eNB). Going further, the terms BS and eNB may be alternatively used. FIG. 1b shows exemplary representation of eNBs in Cloud Radio Access Network CRAN (CRAN)/Virtual Radio Access Network (VRAN) 105. As shown in FIG. 1b, as an example, there may be three base stations 103 or three eNBs such as eNB1, eNB2 and eNB3 wherein eNB1, eNB2 and eNB3 are connected to the CRAN/VRAN 105. The eNB1 may include three cells namely cell a, cell b and cell c. Similarly, the eNB2 may include three cells namely, cell g, cell h and cell i and eNB3 may include three cells namely cell d, cell e and cell f. eNB1 has intra eNB LLRs (from cell b and cell a) and eNB2 and eNB3 have inter eNB LLRs. In an embodiment, the cells a, b, c are intra cells to eNB1, the cells d, e, f are intra cells to eNB3 and the cells g, h, i are intra cells to eNB2 and eNB2 and eNB3 are inter base stations 103 to eNB1.

The UE 101 may transmit one or more data packets to eNB1. In order to decode the one or more data packets, in an embodiment, the LLR is computed. In another embodiment, the I/Q samples may be computed for decoding one or more data packets. In Radio Frequency RF communications systems, Inphase/Quadrature (I/Q) data represents signals in the time-domain. The process of using the I/Q samples for decoding the one or more data packets are illustrated in FIG. 2e. In an embodiment, LLR values and the I/Q values may be associated with weightage values which are function of one or more network parameters [explained in below section]. These weightage values may be learnt using a machine learning model or an artificial intelligence (AI) associated with the base station 103. The machine learning model and the AI may be alternatively used. Based on the weightage values, the intra and inter nodes may be selected or filtered for decoding of the one or more data packets. Upon receiving the one more data packets, the eNB1 may decode the one or more data packets. For successful decoding of the one or more data packets the hierarchical uplink COMP is implemented. In an embodiment, when the one or more data packets are received by eNB1, the eNB1 first computes LLR values for decoding the one or more data packets. Once the LLR values are computed, the computed LLR values are evaluated through a first Cyclic Redundancy Check (CRC). If the evaluation is successful, then the one or more packets are successfully decoded by eNB1. Also, a message is broadcasted to neighbouring base stations 103 associated with the base station 103 to indicate successful decoding of the one or more data packets using the computed LLR values of the base station when the evaluated first CRC is successful. However, if the evaluation is unsuccessful, then eNB1 combines LLR values of neighbouring base stations (one or more intra base stations 103) associated with the base station 103 eNB1. Referring to FIG. 1b, the base station 103 eNB1 receives intra eNB LLR values from cell b and cell a. Thereafter, the eNB1 combines intra eNB LLR values with computed LLR values that is its own LLR values. The eNB1 combines intra eNB LLR values with the computed LLR values when Signal-to-Interference-plus-Noise Ratio (SINR) value of each of the one or more intra base stations 103 is greater than a first predefined threshold. The first predefined threshold for the SINR is obtained from a machine learning model or artificial intelligence associated with the base station 103 which is trained using one or more network parameters. The first predefined threshold is updated at predefined time intervals. The one or more network parameters may include, but not limited to, Quality of Service (QoS) of the communication network, available computing power at CRAN/VRAN 105 and system load. Once the computed LLR and the intra LLR values are combined, the base station 103 eNB1 determines whether the one or more data packets are successfully decoded using the intra LLR values and the computed LLR values by evaluating through a second CRC. If the second CRC is successful, then the one or more data packets are decoded successfully. However, if the second CRC is unsuccessful, then the base station 103, eNB1 combines LLR values of one or more intra base stations 103 and LLR values of neighbouring base stations (one or more inter base stations 103) associated with the base station 103 with the computed LLR values. Referring to FIG. 1b, the one or more inter base stations 103 associated with the base station 103 enB1 are eNB2 and eNB3. Therefore, the eNB1 receives LLR values from eNB2 and eNB3 which are combined with intra LLR values and the computed LLR values of the eNB1. The eNB1 combines the LLR values of one or more intra base stations 103 and LLR values of one or more inter base stations 103 with the computed LLR value when SINR value of each of the one or more inter base stations 103 is greater than a second predefined threshold. The second predefined threshold for the SINR is also obtained from the machine learning model or artificial intelligence associated with the base station 103 which is trained using the one or more network parameters. The second predefined threshold is also updated at predefined time intervals. Once the eNB1 combines the LLR values of one or more intra base stations 103 and LLR values of one or more inter base stations 103 with the computed LLR value, the base station 103 determines whether the one or more packets are successfully decoded using the LLR values of the one or more intra base stations 103, LLR values of the one or more inter base stations 103 and the computed LLR values by evaluating through a third CRC. If the one or more packets are successfully decoded, then the method terminates, else the base station 103 eNB1 receives redundant version of the one or more data packets from the UE 101 for decoding the one or more packets when the evaluated third CRC is unsuccessful. The base station 103 may receive LLR and/or I/Q samples from one or more other base stations associated with the base station 103 when the redundant versions are received for decoding the one or more data packets. To this effect, the base station 103 may transmit a signal to the one or more base stations from which the I/Q/LLR samples may be received. The signal may be transmitted periodically or aperiodically. In an embodiment, based on location of the UE 101, the inter cells may be identified which are best suited for the UE 101. As an example, the inter cells may be classified into subsets of cells such as tier-1, tier-2 and so forth. Based on the location of the UE 101 the inter cells from tier-2 may also be selected instead of hierarchical method. Also, in an embodiment, the base station 103 may create a map or a look-up table for each UE 101 based on the one or more inter base stations 103 identified for the UE 101 based on the UE 101 location and function of Modulation Coding Scheme (MCS). Also based on Quality of Service Class Indicator (QCI) and Quality Service and Solution (QSS) which signifies quality of the application the intra cells which are best suited for the UE 101 may be identified and this information may also be updated in the map. The LLR and I/Q combining may be interchangeably used for hierarchical uplink CoMP based on type of application as well. Further, the machine learning model may classify the coverage area into multiple regions based on interference maps, coverage maps, help cells maps based on the one or more network parameters (long/short/instantaneous/Finite Impulse Response (FIR)/(Infinite Impulse Response)IIR filtered values can be used). In an embodiment, the present disclosure may be used in online or offline or rule-based and the algorithms may run in real and/or near real time system. The machine learning model may run periodically or aperiodically as well. Therefore, the present disclosure provides an uplink COMP method with hierarchical decoding of one or more data packets for VRAN which uses machine learning and artificial intelligence to compute the LLR and SINR predefined threshold values for every eNB for intra and inter eNB. Therefore, the present disclosure significantly increases efficiency of the system and also the required fronthaul/backhaul requirement will come down with the proposed uplink COMP which results in higher overall system throughput. Also, the radio spectral utilization and efficiency will be improved for VRAN/CRAN 105 with the proposed uplink combining and UE 101 power efficiency will be improved as the number of redundancy version that are to be transmitted are lesser and uplink data experience lesser latency. This also reduces the packet blocking probability. Further, use of inter LLRs introduces significant backhaul in the network and due to the backhaul delay increases in packet decoding which in turn increases latency. But in the present disclosure the intra and inter LLR values are used only when required and hence reduces latency and packet decoding time and also reduces load in the backhaul network. Therefore, the resources may be efficiently utilized as the inter base stations 103 focuses on other UE 101s.

Figure 2A:
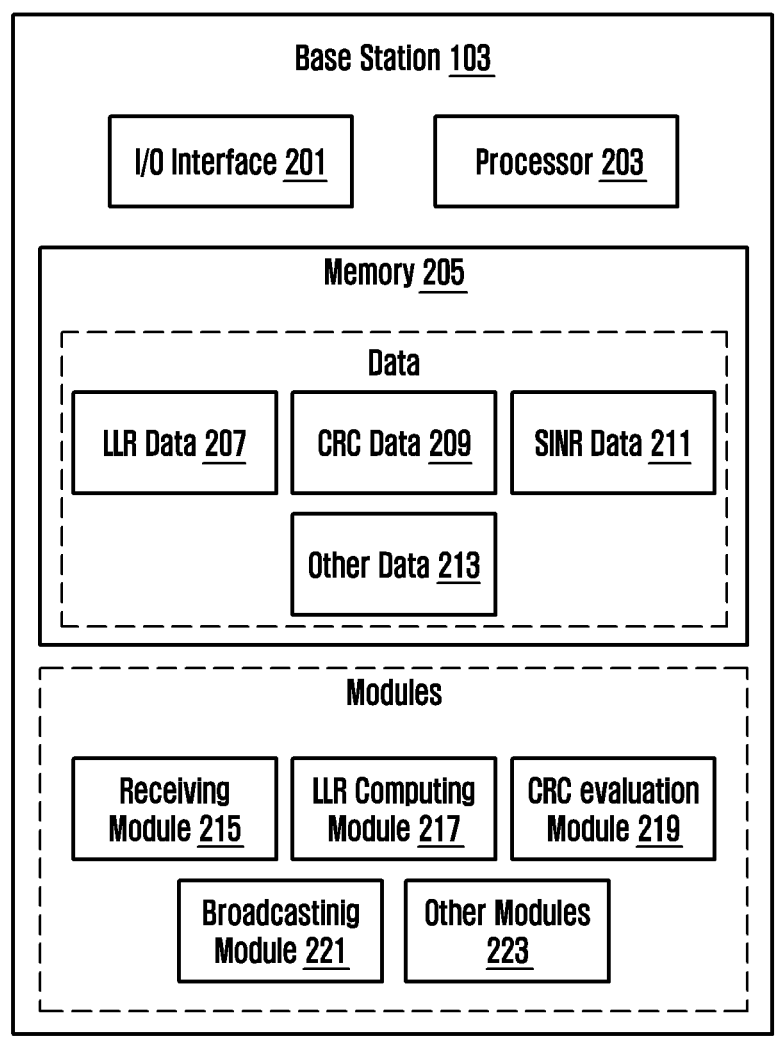
FIG. 2a illustrates block diagram of a base station for hierarchical decoding of one or more data packets in a cellular communication system in accordance with some embodiments of the present disclosure.

FIG. 2a shows a block diagram of a base station in accordance with some embodiments of the present disclosure.

In some implementations, the base station 103 may include an I/O interface 201, a processor 203, and a memory 205. The I/O interface 201 may be configured to receive the one or more data packets from the UE 101. The processor 203 may be configured to decode the one or more data packets using hierarchical uplink combining. The system may include data and modules. As an example, the data is stored in the memory 205 configured in the base station 103 as shown in the FIG. 2a. In one embodiment, the data may include LLR data 207, CRC data 209, SINR data 211 and other data 213. In the illustrated FIG. 2a, modules are described herein in detail.

In some embodiments, the data may be stored in the memory 205 in form of various data structures. Additionally, the data can be organized using data models, such as relational or hierarchical data models. The other data may store data, including temporary data and temporary files, generated by the modules for performing the various functions of the base station 103.

In some embodiments, the data 206 stored in the memory 205 may be processed by the modules of the system 103. The modules may be stored within the memory 205. In an example, the modules communicatively coupled to the processor 203 configured in the system 103, may also be present outside the memory as shown in FIG. 2a and implemented as hardware. As used herein, the term modules may refer to an Application Specific Integrated Circuit (ASIC), an electronic circuit, a processor 203 (shared, dedicated, or group) and memory 205 that execute one or more software or firmware programs, a combinational logic circuit, and/or other suitable components that provide the described functionality.

In some embodiments, the modules may include, for example, a receiving module 215, a LLR computing module 217, a CRC evaluation module 219, a broadcasting module 221 and other modules 223. The other modules 223 may be used to perform various miscellaneous functionalities of the base station 103. It will be appreciated that such aforementioned modules may be represented as a single module or a combination of different modules.

Furthermore, a person of ordinary skill in the art will appreciate that in an implementation, the one or more modules may be stored in the memory 205, without limiting the scope of the disclosure. The said modules when configured with the functionality defined in the present disclosure will result in a novel hardware.

In an embodiment, the receiving module 215 may be configured to receive one or more data packets from the UE 101. In an embodiment, the LLR computing module 217 may be configured to compute LLR values of the base station 103 and store as LLR data 207. At first, the LLR value of the base station 103 eNB1 is computed. The computed LLR values of eNB1 are evaluated through the first CRC using the CRC evaluation module 219 for determining whether the one or more data packets are successfully decoded. If the first CRC is unsuccessful, then the eNB1 receives LLR values of one or more intra base stations 103. Thereafter, the computed LLR values are combined with the LLR values of the one or more intra base stations 103 when the SINR values of each of the one or more intra base stations 103 is greater than a first predefined threshold. Then the base station 103 eNB1 determines whether the one or more data packets are successfully decoded using the LLR values of the one or more intra base stations 103 and the computed LLR values by evaluating through the second CRC using the CRC evaluation module 219. In an embodiment, the base station 103 combines LLR values of one or more intra base stations 103 and LLR values of one or more inter base stations 103, associated with the base station 103, with the computed LLR values for decoding the one or more packets when at least one of SINR value of each of the one or more inter base stations 103 is greater than a second predefined threshold and when the evaluated second CRC is unsuccessful. The first predefined threshold and the second predefined threshold may be stored as SINR data 211. Thereafter, the base station 103 determines whether the one or more packets are successfully decoded using the LLR values of the one or more intra base stations 103, LLR values of the one or more inter base stations 103 and the computed LLR values by evaluating through a third CRC. The evaluated first CRC, second CRC and the third CRC are stored as CRC data 209. So, in this manner, the LLR values are hierarchically combined for decoding the data packets based on SINR values and by determining whether CRC is successful or not.

In an embodiment, the first predefined threshold and the second predefined threshold are obtained from machine learning model associated with the base station 103 which is trained using one or more network parameters. As an example, the one or more network parameters may include, but not limited to, Quality of Service (QoS), instantaneous or average SINR, average or instantaneous Channel Quality Index (CQI) information, available computing power at cloud systems and the system load. If QOS is good, then the base station 103 eNB1 may not wait for intra and inter eNBs LLRs. Also, if the system load is more, then the base station may not wait for intra and inter eNBs LLRs. However, if the available computing power at the cloud system is more, then the base station 103 may use intra eNBs LLRs.

In the training phase of machine learning model, weights/predefined threshold, first predefined threshold and second predefined threshold may be updated using back propagation algorithm. Once the learning is completed, the first predefined threshold ($\alpha$) and the second predefined threshold ($\beta$) are determined. In an embodiment, the other network parameters which may be provided as input to the machine learning model may include, but not limited to, Time, BS ID, Frequency of operation, day details, Place of location, density of the traffic, distribution of the traffic, climate conditions, special occasions, festivals and functions, calendar based events, vacation details/distribution, UE 101 information, UE 101 type/UE 101 category/UE 101 monthly package, data type information, measurements, offers in malls/movie release dates and sports/school/office events.

In an embodiment, the base station 103 may choose or discard intra and inter eNB LLR values based on the trained machine learning or artificial intelligence neural network model. As an example, SINR of its own eNB may be P1, intra eNBs be $\alpha$ and inter eNBs be $\beta$. To discard the intra and inter eNB LLRs, threshold techniques may be employed based on SINR values.

For example: Accept intra eNB LLRs, only if $$\alpha >= P1/k1$$

Accept inter eNB LLRs, only if $$\beta >= P1/k2$$

Here, k1 and k2 may be decided based on losses due to channel effect, noise, and interference in the network. k1 and k2 values are non-zero and positive values. k1 and k2 values may be learnt using above procedure using back propagation algorithm.

In an embodiment, the one or more network parameters may be trained using machine learning model using penalty function. This penalty function is decided on how much throughput is gained/lost from using intra and inter eNBs LLRs. As an example, the linear predictive model may be used for this purpose. In an embodiment, at every instant of time, whenever intra and inter eNB LLRs are used, the thresholds are updated based on throughput gained. Also, in an embodiment, counters may be maintained for significant gains and the counter values are updated whenever intra and inter eNB LLRs are used by the base station 103, based on SINR, noise and interference. So, based on the counter values, performance of the model may be estimated, and these counter values may be provided as feedback and then the first predefined threshold and the second predefined threshold may be set. Therefore, the machine learning model may be used for estimating the first predefined threshold and the second predefined threshold based on the counter value.

In an embodiment, the broadcasting module 221 may be configured to broadcast a message to neighbouring base stations 103 associated with the base station 103 to indicate successful decoding of the one or more data packets using the computed LLR values of the base station 103 when the evaluated first CRC is successful. By broadcasting such messages lot of bandwidth may be saved and also congestion may be reduced. Also, the broadcasting module 221 may be configured to send one bit information to request for intra and inter eNB LLR values. As an example, the value 1 in the one bit information may represent "transmit the LLR value" and value 0 in the one bit information may represent "don't transmit the LLR values". If the cell can decode the LLR values, then the method completes. Else, cell will transmit one bit of information to centralized control unit in VRAN, to request for inter LLR values. As the different cells uses different cores in the virtual RAN, based on the one bit information for intra cell, intra cell LLR values are exchanged. Another one bit information for inter cell to where inter cell LLR values are exchanged. Therefore, instead of UE 101 sending information multiple times in case of Hybrid Automatic Repeat Request (HARQ) Negative Acknowledgment (NACK), the CRAN/VRAN 105 would receive LLRs from inter and intra eNBs. This saves UE 101 power and improves throughput of the UE 101. In an embodiment, prior to receiving the LLRs from intra and inter eNBs, the base station 103 may exchange scheduling information of UE 101 and request for LLRs for certain number of UEs 101 only. Also based on the scheduling information of the UE 101, the intra and inter base stations 103 may decide not to transmit the LLR values based on the SINR values and due to bandwidth constraints.

In an embodiment, in CRAN/VRAN context during calculation of LLR values in each hierarchical step, the machine learning model may provide feedback to L3 layer in providing information of which intra or inter eNB cells to be selected for performing uplink CoMP. So, in this implementation, the UE 101 position may be considered for optimizing the selection of target cells (intra eNB or inter eNB cells) for uplink CoMP. the L3 filtering of target cells improves efficiency of the algorithm by optimizing the target cells per UE 101 for uplink CoMP.

Figure 2B:
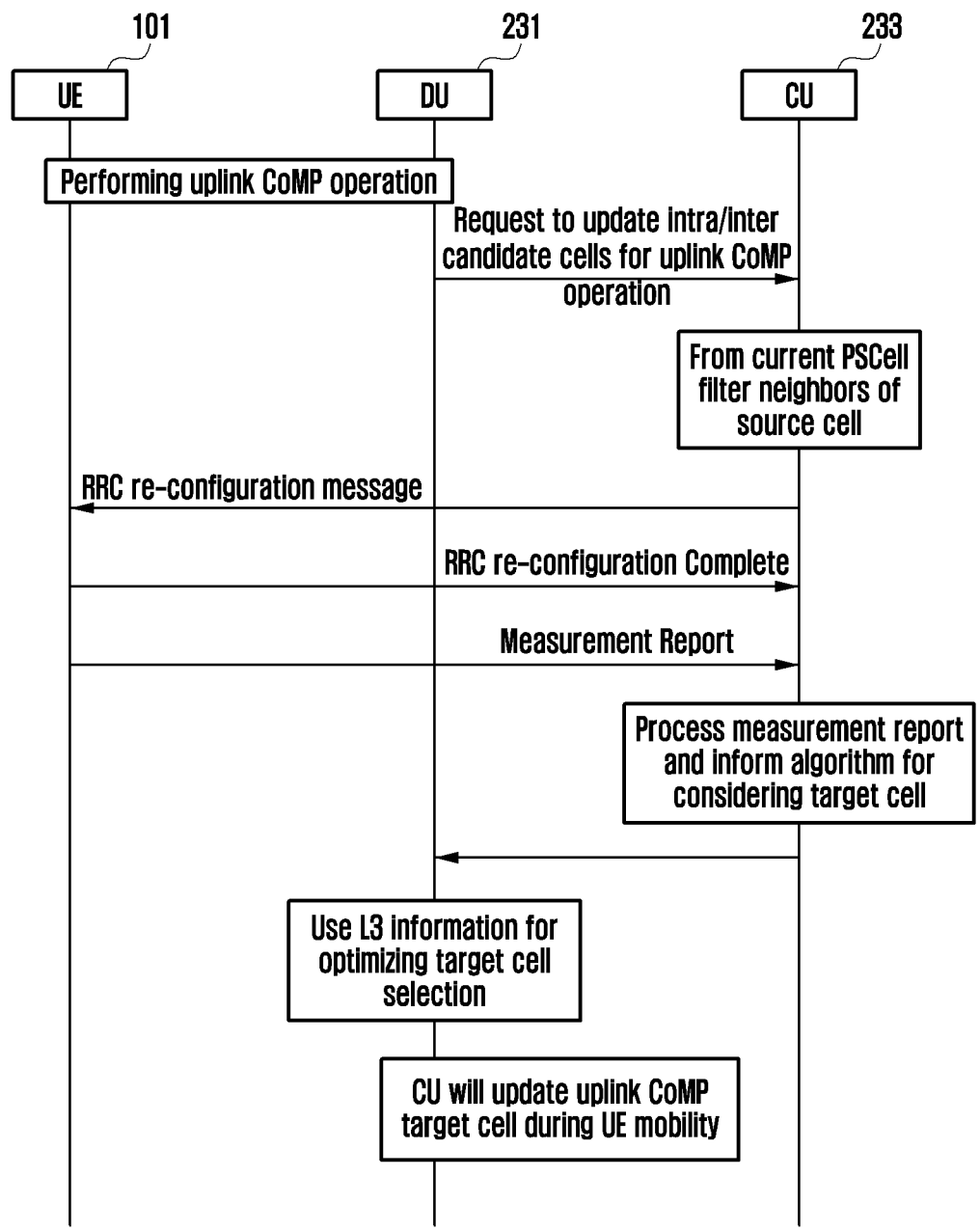
FIG. 2b shows a sequence diagram illustrating process of target cell selection in CRAN/VRAN context in accordance with some embodiments of the present disclosure.

FIG. 2b shows a sequence diagram illustrating process of target cell selection in CRAN/VRAN context in accordance with some embodiments of the present disclosure.

As shown in FIG. 2b, the machine learning algorithm or lower layer that is the Distributed Unit (DU) 231 may request the upper layer Control unit (CU) 233 in L3 layer of CRAN/VRAN architecture for information about best cells intra/inter eNB cells for uplink CoMP. Upon receiving the request, the CU 233 may send a message that is RRC reconfiguration message to the UEs 101 to listen to cells and configure measurement objects for the candidate neighbor cells of a source cell. Once RRC reconfiguration is completed, the measurement report is shared by the UE 101 to the CU. The measurement report may contain information of power of the cells [Reference Signal Receive Power (RSRP) and Reference Signal Receive Quality (RSRQ)] that is intra/inter eNB cells which are good for the UE 101. Upon receiving the measurement report the CU 233 may provide the machine learning algorithm for best cell or target cell and feed the information about the best cell to the DU 231 for the machine learning algorithm and for the purpose of uplink CoMP for optimizing the target cell.

Figure 2C:
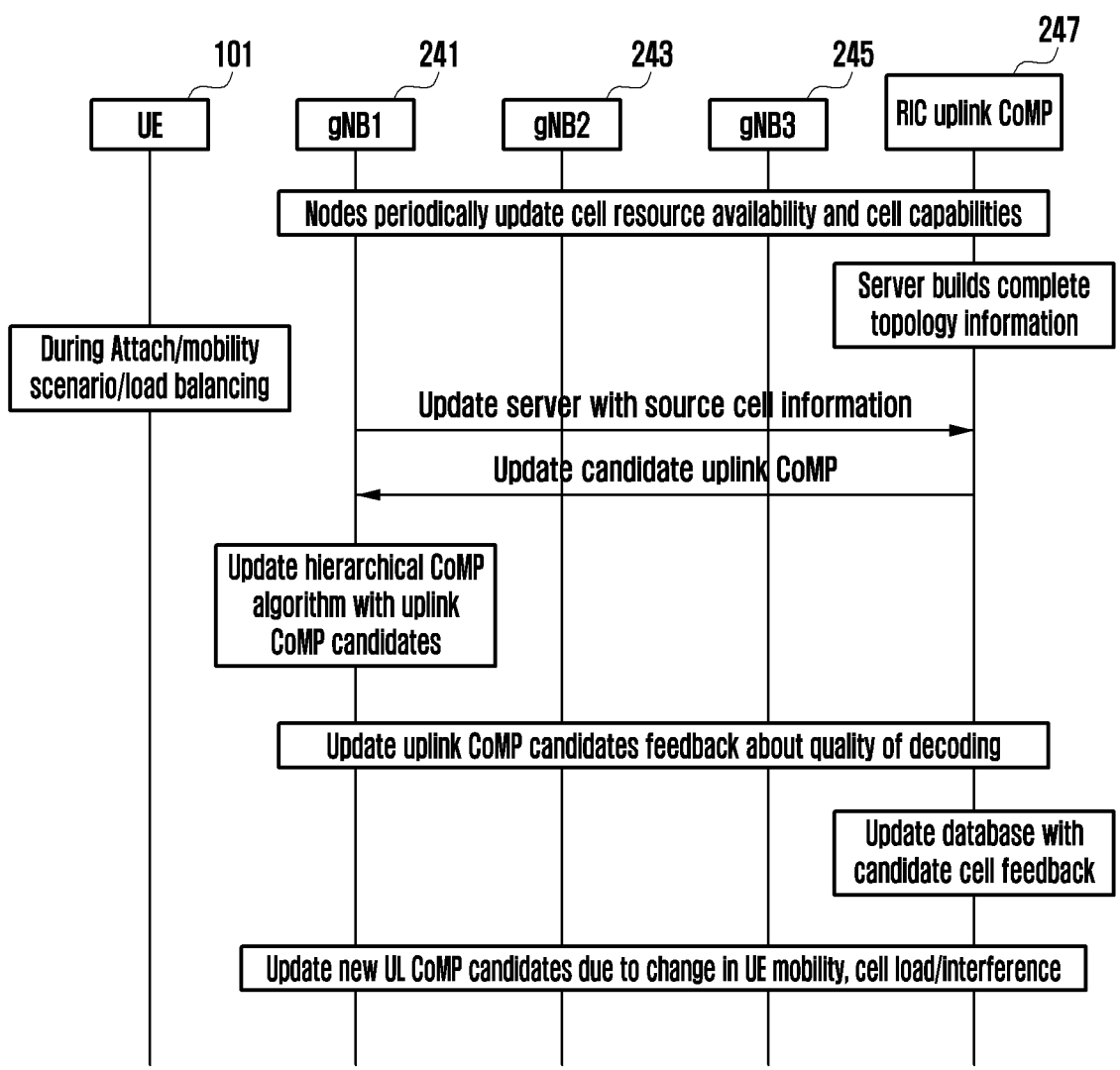
FIG. 2c shows a sequence diagram illustrating process of target cell selection in ORAN context in accordance with some embodiments of the present disclosure.

FIG. 2c shows a sequence diagram illustrating process of target cell selection in Open Radio Access Network (ORAN) context in accordance with some embodiments of the present disclosure.

In ORAN context, an RAN Intelligent Controller (RIC) 247 is implemented for streamlining hierarchical uplink CoMP algorithm/method. FIG. 2c shows UE 101, various gNB such as gNB1 241, gNB2 243, gNB3 245 (collectively referred as gNBs) and RIC 247. The gNBs periodically update the RIC 247 about the cell resource availability and the cell capabilities to the RIC 247 using RIC 247 subscription/indication procedure. Upon receiving the cell information, the RIC 247 builds a complete topology information of the cells. During the initial attach or mobility, the RIC may predict the possible uplink CoMP candidate cell and provide the algorithm about this information. The RIC 247 may consider the candidate cell interference, throughput, performance before considering or filtering the cell for uplink CoMP. In an embodiment, the UE 101 position velocity and direction of movement will be also taken care during the decision making or cell filtering. The hierarchical uplink CoMP may periodically provide feedback about the performance on uplink CoMP candidate cells which may be used for further optimizing RIC application in the RIC 247. Based on the hierarchical uplink CoMP feedback and UE 101 position, the uplink CoMP candidate may be periodically updated by the RIC 247. In this manner, the target cells are selected or filtered for hierarchical uplink CoMP wherein the RIC acts as a centralized server which receives information form all the nodes in the communication network instead of requesting from each cell. Based on location of the UE RIC intelligently suggests one or more cells for the UE 101 which may be considered for uplink CoMP.

Figure 2D:
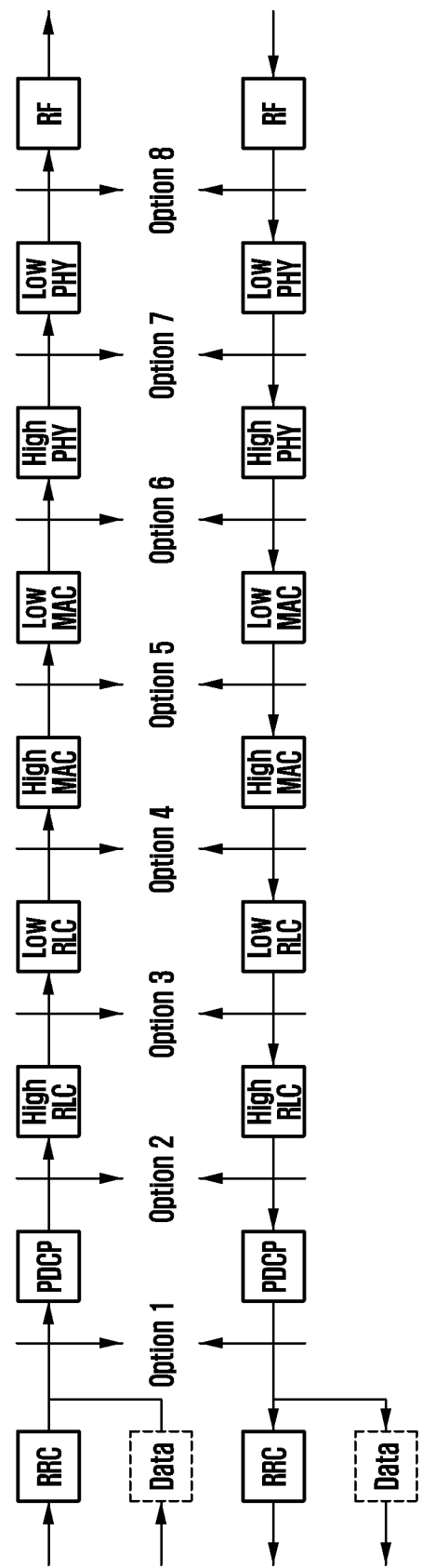
FIG. 2d illustrates split options available for CRAN/VRAN systems and ORAN systems in accordance with some embodiments of the present disclosure.
Figure 2E:
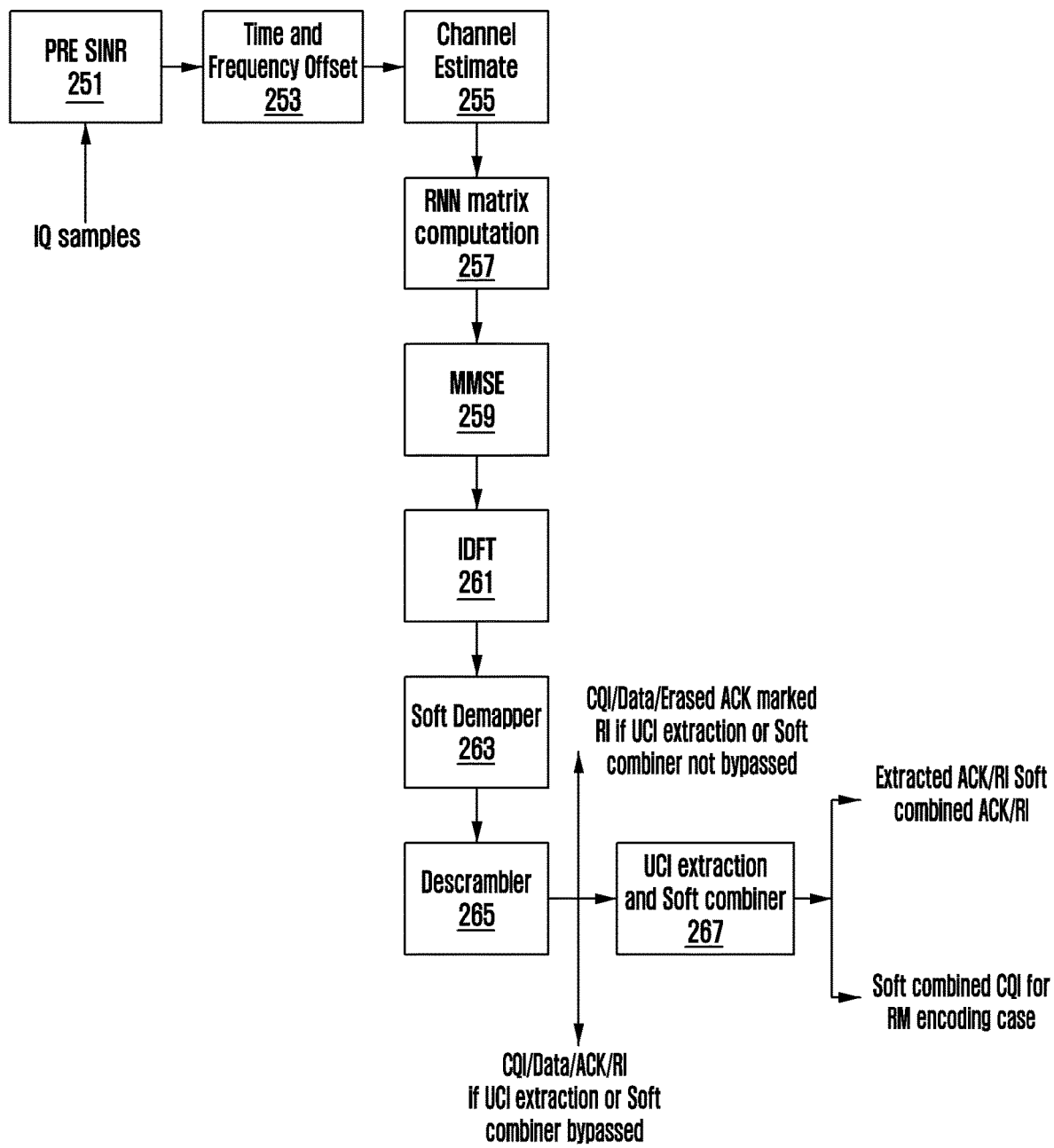
FIG. 2e illustrates a process of using the I/Q samples for decoding the one or more data packets in accordance with some embodiments of the present disclosure.

FIG. 2d illustrates split options available for CRAN/VRAN systems and ORAN systems in accordance with some embodiments of the present disclosure.

In an embodiment, the machine learning based CoMP may communicate between the PHY, Media Access Control (MAC), Radio Link Control (RLC), Radio Resource Control (RRC) for recommending uplink CoMP candidate cells. Based on the split options selected for deployment, the rest of the layers may be in Cloud. As an example, if the option 6 is chosen, then Lower-PHY till RRC layer will be in Cloud and rest of the components will be in hardware and information exchange will be through standard ORAN interface. In an embodiment, based on the split option architecture, the information are exchanged between the source (uplink CoMP algorithm) and target (RIC) using the standard E2AP/E2SM ORAN interface.

FIG. 2e illustrates a process of using the I/Q samples for decoding the one or more data packets in accordance with some embodiments of the present disclosure.

As shown in FIG. 2e, the Pre-SINR module 251 may receive I-Q Samples from front-end system i.e. from Remote Radio Head or Radio Unit) to back-end Physical (also called as upper Physical). For computing pre-SINR value. The pre-SINR value may be the rough estimate of the SINR value. The time and frequency offset module 253 may be configured to estimate timing offset and correct the I-Q samples and estimate frequency offset and correct the I-Q samples. In the channel estimation module 255, the channel matrix of a user may be computed. Each user can be assigned more than one resource block. In the RNN matric computation module 257, interference+Noise correlation matrix may be computed which may be used in channel equalization module. In the channel equalization module, the impact of channel may be removed. Usually, Minimum Mean Square Error (MMSE) 259 based algorithms are used to remove the channel effect. In the soft-demapper 263 or LLR module, the LLR values of each symbol is computed. Each data packet may have multiple symbols, and hence compute LLR values are computed for all symbols. Usually descrambler 265 and soft-demapper modules 263 are merged into one module. Descrambler 265 performs descrambling of the data and then provided to the UCI extraction and soft combiner 267 for combining the LLR values. Then control and data information are segregated and then sent to the decoders. Output of the decoder is provided for CRC check.

In an embodiment, the I/Q samples may be used for decoding the one or more packets. At first, the base station 103 may compute pre-SINR values for decoding one or more data packets based on the received I/Q samples. The pre-SINR value may be the rough estimate of the SINR value. In an embodiment, the LLR values of the base station 103 are computed when the pre-SINR is within an expected SINR range and the computed LLR value is evaluated through a CRC to determine whether the one or more data packets are successfully decoded. If the computed pre-SINR is not within an expected SINR range then in one embodiment, the base station 103 may receive neighboring intra and/or inter base station 103 I/Q samples in any order and combine the intra and/or the inter base station 103 I/Q samples for decoding the one or more data packets by passing through the CRC. If the CRC is successful, then the method terminates. If the computed pre-SINR is not within an expected SINR range then in another embodiment, the base station 103 may receive neighboring intra and/or inter base station I/Q and/or LLR values and combine the intra and/or the inter base station 103 I/Q and or LLR values for decoding the one or more data packets by passing through the CRC. In this manner any permutation and combination of combining the intra or inter I/Q samples or LLR values in any order may be performed based on location of the UE 101 for decoding of the one or more data packets. In an embodiment, in some scenarios wherein pre-SINR is very less compared to the expected range then it may be abandoned or the process of combining the intra and inter cells may be performed simultaneously. So, the combining process may be done at LLR or I/Q at each step. The combining techniques may be exploited using the one or more network parameters and the machine learning model may be generalized using Markov decision process.

Figure 3:
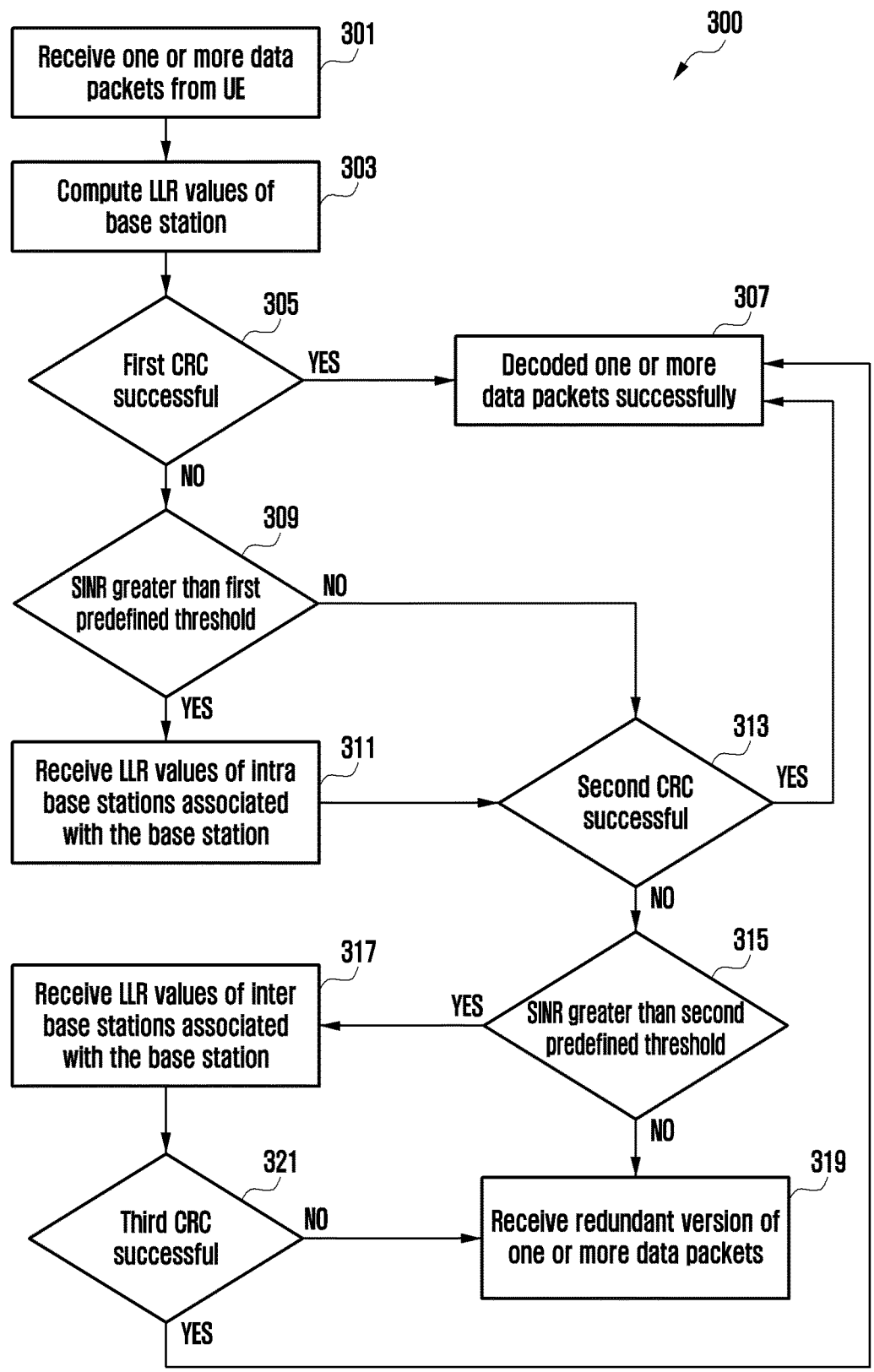
FIG. 3 shows a flowchart illustrating a method for hierarchical decoding of one or more data packets in a cellular communication system in accordance with some embodiments of the present disclosure.

FIG. 3 shows a flowchart illustrating a method for hierarchical decoding of one or more data packets in a cellular communication system.

As illustrated in FIG. 3, the method includes one or more blocks illustrating a method of hierarchical decoding of one or more data packets in a cellular communication system. The method may be described in the general context of computer executable instructions. Generally, computer executable instructions can include routines, programs, objects, components, data structures, procedures, modules, and functions, which perform specific functions or implement specific abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method may include receiving, by a base station 103, one or more data packets from a UE 101 in a cellular communication system. The one or more data packets may be received for decoding in uplink CoMP.

At block 303, the method may include computing LLR values by the base station 103. As an example, the base station 103 may be eNB1 which receives the one or more data packets from the UE 101. The base station 103 eNB1, may compute LLR values upon receiving the one or more data packets for decoding the one or more data packets.

At block 305, the method may include evaluating a first CRC to determine whether the one or more data packets are successfully decoded using the computed LLRs. If the evaluated first CRC is successful, then the method may proceed to block 307. At block 307, the one or more data packets are successfully decoded using the computed LLRs of the base station 103, eNB1. If the evaluated first CRC is unsuccessful, then the method may proceed to block 309.

At block 309, the method may include determining SINR value of one or more intra base stations 103 associated with the base station 103, eNB1. The SINR value of the one or more intra base stations 103 is compared with a first pre-defined threshold. When the SINR value of the one or more intra base stations 103 is greater than the first predefined threshold, then the method may proceed to block 311. When the SINR value of the one or more intra base stations 103 is less than or equal to the first predefined threshold, then the method may proceed to block 313.

At block 311, the method may include receiving LLR values of each of the one or more intra base stations 103.

At block 313, the method may include evaluating a second CRC to determine whether the one or more data packets are successfully decoded using the computed LLRs and the LLR values of the intra base stations 103 associated with the base station 103, eNB1. If the evaluated second CRC is successful, then the method may proceed to block 307. If the evaluated second CRC is unsuccessful, then the method may proceed to block 315.

At block 315, the method may include determining SINR value one or more inter base stations 103 associated with the base station 103, eNB1. The SINR value of the one or more inter base stations 103 is compared with a second predefined threshold. When the SINR value of the one or more inter base stations 103 is greater than the second predefined threshold, then the method may proceed to block 317. When the SINR value of each of the one or more inter base stations 103 is less than or equal to the second predefined threshold, then the method may proceed to block 319.

At block 317, the method may include receiving LLR values of each of the one or more inter base stations 103.

At block 321, the method may include evaluating a third CRC to determine whether the one or more data packets are successfully decoded using the computed LLRs, the LLR values of the intra base stations 103 associated with the base station 103, eNB1 and the LLR values of the inter base stations 103 associated with the base station 103, eNB1. If the evaluated third CRC is successful, then the method may proceed to block 307. If the evaluated second CRC is unsuccessful, then the method may proceed to block 319.

At block 319, the method may include receiving redundant version of the data packets from the UE 101 for decoding the one or more data packets.

FIG. 4a shows a graph illustrating exemplary scenario of how the intra and inter LLR values are used based on SINR value of the base station 103 in accordance with some embodiments of the present disclosure. For the purpose of illustration and as an example, the channel distribution in the base station 103 is considered to be Gaussian with noise variance 1, the channel distribution in the intra eNB is considered to be Gaussian with noise variance 1.25 and the channel distribution in the inter eNB is considered to be Gaussian with noise variance 1.5. Based on these considerations, FIG. 4a shows graphical representation of when the data packets are successfully decoded that is using LLR value of its own base station 103 or using LLR values of its own base station 103 and intra base station 103 and using LLR values of its own base station 103 and LLR values of intra and inter base station 103. The X-axis represents SINR in dB and the Y-axis represents the percentage of the packets decoded. The Table 1 illustrates in detail on when the intra and inter LLR values has to be considered based on the SINR values in dB shown in X-Axis in FIG. 4a.

TABLE 1

| SNR in dB | Using its own LLRs | Using intra eNB LLRs | Using inter eNB LLRs | What we need |
|---|---|---|---|---|
| 1 | 0% | 0% | 1.70% | Both intra and inter |
| 2 | 0% | 0% | 88.40% | Both intra and inter |
| 3 | 0% | 17.30% | 82.70% | Both intra and inter |
| 4 | 0% | 83.00% | 17.00% | Only Intra |

TABLE 1-continued

| SNR in dB | Using its own LLRs | Using intra eNB LLRs | Using inter eNB LLRs | What we need |
|---|---|---|---|---|
| 5 | 0% | 99.70% | 0.00% | Only Intra |
| 6 | 0% | 100.00% | 0.00% | Only Intra |
| 7 | 5.70% | 94.30% | 0.00% | Only Intra |
| 8 | 50.60% | 49.40% | 0.00% | Only Intra |
| 9 | 94.30% | 5.70% | 0.00% | No need of Intra and Inter |
| 1 | 99.50% | 0.50% | 0.00% | No need of Intra and Inter |
| 1 | 99.90% | 0.01% | 0.00% | No need of Intra and Inter |
| 1 | 100.00% | 0.00% | 0.00% | No need of Intra and Inter |

As shown in Table 1 above, at low SINR (below 3 dB), we need LLR values of Intra and Inter BS to decode the packets successfully. At mid-range SINR (4 to 8 dB), we need LLR values of Intra BS only for decoding the packets successfully. It may be observed that as we need only intra BS LLRs at this stage for successful decoding of the data packets, the spectral efficiency may be saved by 33%. At high SINR (above 8 dB), BS does not need LLR of Intra and Inter BS to decode the packets successfully. Therefore, it may be observed that, since only LLR value of its own BS is required for successful decoding of the data packets, the spectral efficiency may be saved by 66%.

FIG. 4b shows a graph illustrating another exemplary scenario of how the intra and inter LLR values are used based on SINR value of the base station 103 in accordance with some embodiments of the present disclosure. For the purpose of illustration and as an example, the channel distribution in the base station 103 is considered to be Gaussian with noise variance 1, the channel distribution in the intra eNB is considered to be Gaussian with noise variance 1.5 and the channel distribution in the inter eNB is considered to be Gaussian with noise variance 2. Based on these considerations, FIG. 4b shows graphical representation of when the data packets are successfully decoded that is using LLR value of its own base station 103 or using LLR values of its own base station 103 and intra base station 103 and using LLR values of its own base station 103 and LLR values of intra and inter base station 103. The X-axis represents SINR in dB and the Y-axis represents the percentage of the packets decoded. The Table 2 illustrates in detail on when the intra and inter LLR values has to be considered based on the SINR values in dB shown in X-Axis in FIG. 4b.

TABLE 2

| SNR in dB | Using its own LLRs | Using intra eNB LLRs | Using inter eNB LLRs | What we need |
|---|---|---|---|---|
| 1 | 0% | 0% | 9.90% | Both intra and inter |
| 2 | 0% | 0% | 96.70% | Both intra and inter |
| 3 | 0% | 1.20% | 98.80% | Both intra and inter |
| 4 | 0% | 44.50% | 55.50% | Both intra and inter |
| 5 | 0% | 97.00% | 3.00% | Only Intra |
| 6 | 0% | 100.00% | 0.00% | Only Intra |
| 7 | 5.70% | 94.30% | 0.00% | Only Intra |
| 8 | 50.60% | 49.40% | 0.00% | Only Intra |
| 9 | 94.30% | 5.70% | 0.00% | Only Intra |
| 10 | 99.50% | 0.05% | 0.00% | No need of Intra and Inter |
| 11 | 99.90% | 0.01% | 0.00% | No need of Intra and Inter |
| 12 | 100.00% | 0.00% | 0.00% | No need of Intra and Inter |

As shown in Table 2 above, at low SINR (below 4 dB), we need LLR values of Intra and Inter BS to decode the packets successfully. At mid-range SINR (4 to 8 dB), we need LLR values of Intra BS only for decoding the packets successfully. It may be observed that as we need only intra BS LLRs at this stage for successful decoding of the data packets, the spectral efficiency may be saved by 33%. At high SINR (above 8 dB), BS does not need LLR of Intra and Inter BS to decode the packets successfully. Therefore, it may be observed that, since only LLR value of its own BS is required for successful decoding of the data packets, the spectral efficiency may be saved by 66%. At mid-range SINR, as UE 101 need not send LLRs to intra eNBs, throughput is improved by 33%. At high range SINR, as UE 101 need not send LLRs to intra eNBs, throughput is improved by 66%. As UE 101 need not send LLRs to intra and inter eNBs battery power of the UE 101 is improved and also spectral efficiency is improved.

Computer System

Figure 5:
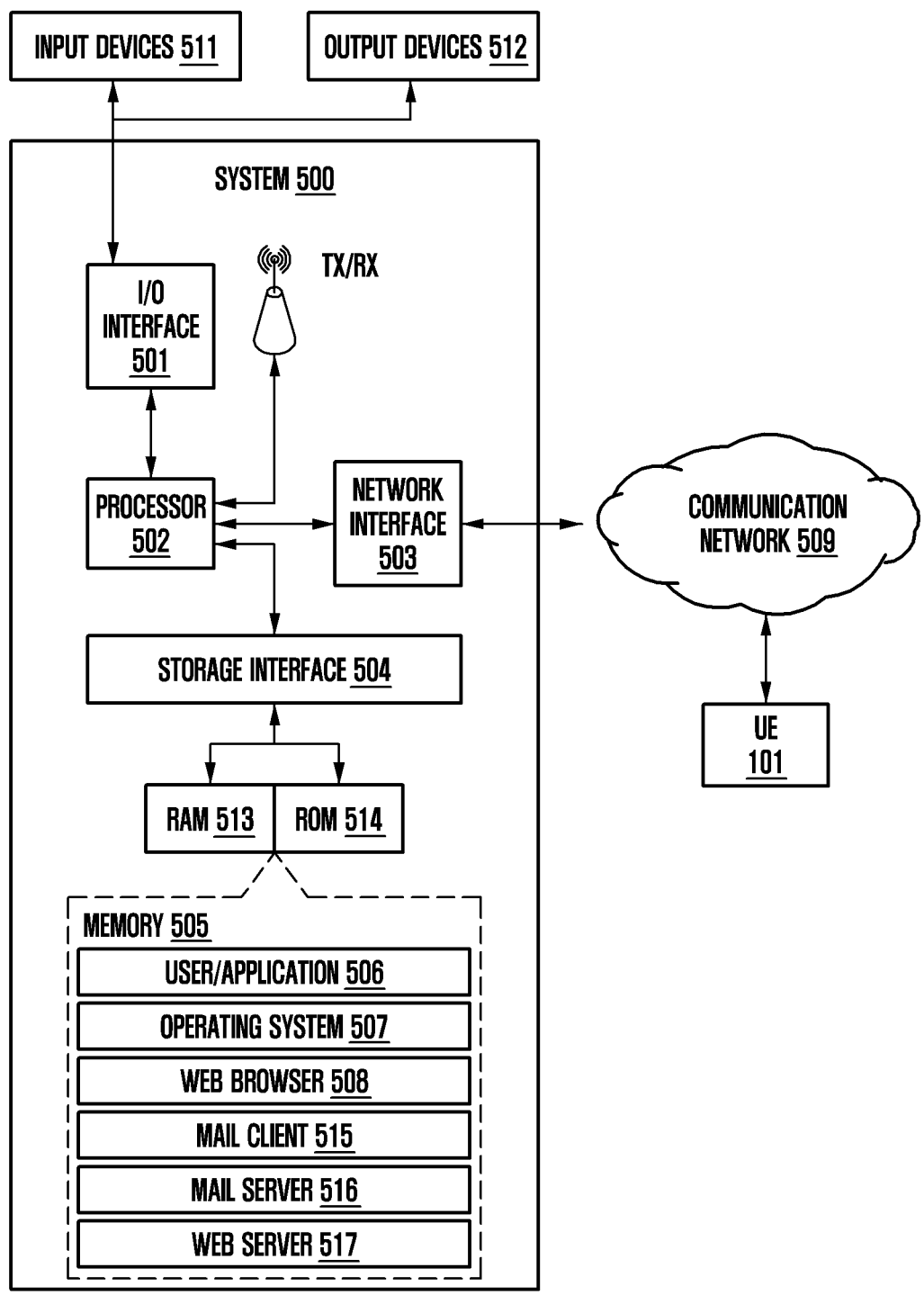
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be a base station 103. The computer system 500 may include a central processing unit ("CPU" or "processor") 502. The processor 502 may comprise at least one data processor for executing program components for executing user or system-generated business processes. The processor 502 may include specialized processing units such as integrated system (bus) controllers, memory management control units, floating point units, graphics processing units, digital signal processing units, etc.

The processor 502 may be disposed in communication with one or more Input/Output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, a mail client 515, a mail server 516, a web server 517, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems 507 include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 600, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure Are Illustrated Herein.

In an embodiment, the present disclosure provides a method and system for hierarchical decoding of one or more data packets in a cellular communication system and thereby increases spectral efficiency of the system and required fronthaul/backhaul requirement will come down with the proposed uplink Coordinated multipoint processing (COMP) which results in in higher overall system throughput.

In an embodiment, the present disclosure can be used for VRAN/CRAN/5G/4G legacy systems.

In an embodiment, the Radio Spectral utilization and efficiency will be improved due to method of the present disclosure for VRAN/CRAN for uplink combining. Also, the present disclosure reduces computation time for VRAN/CRAN systems.

In an embodiment, the present disclosure uses lesser back haul bandwidth requirement when compared to the existing schemes as the present disclosure is based on threshold methods. The thresholds of various parameters such SINR are learnt dynamically using machine learning and artificial intelligence algorithms.

In an embodiment, UE power efficiency will be improved as the number of redundancy version that are to be transmitted are lesser. Uplink data experience lesser latency thereby reducing the packet blocking probability. Also, the present disclosure facilitates faster decoding of the data packets as the LLR values from intra and inter base stations are combined in a hierarchical manner.

In an embodiment, the present disclosure reduces computational complexity for 4G/5G/VRAN/CRAN and requires lesser cores for computing the LLRs and hence cost efficient.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of hierarchical decoding of one or more data packets in a cellular communication system, the method comprising:

computing, by a base station in the cellular communication system, Log Likelihood Ratio (LLR) values for decoding one or more data packets received from a User Equipment (UE) in the cellular communication system;

evaluating, by the base station, the computed LLR values through a first Cyclic Redundancy Check (CRC) to determine whether the one or more data packets are successfully decoded;

combining, by the base station, LLR values of one or more intra base stations, associated with the base station, with the computed LLR values for decoding the one or more data packets when at least one of Signal-to-Interference-plus-Noise Ratio (SINR) value of each of the one or more intra base stations is greater than a first predefined threshold and when the evaluated first CRC is unsuccessful;

determining, by the base station, whether the one or more data packets are successfully decoded using the LLR values of the one or more intra base stations and the computed LLR values by evaluating through a second CRC;

combining, by the base station, the LLR values of one or more intra base stations and LLR values of one or more inter base stations, associated with the base station, with the computed LLR values for decoding the one or more packets when at least one of SINR value of each of the one or more inter base stations is greater than a second predefined threshold and when the evaluated second CRC is unsuccessful;

determining, by the base station, whether the one or more packets are successfully decoded using the LLR values of the one or more intra base stations, LLR values of the one or more inter base stations and the computed LLR values by evaluating through a third CRC; and receiving, by the base station, redundant version of the one or more data packets from the UE for decoding when the evaluated third CRC is unsuccessful.

2. The method as claimed in claim 1, wherein the first predefined threshold and second predefined threshold are obtained from a machine learning model associated with the base station which is trained using one or more network parameters.

3. The method as claimed in claim 2, wherein the first predefined threshold and the second predefined threshold is updated at predefined time intervals.

4. The method as claimed in claim 1, further comprising: broadcasting a message to neighboring base stations associated with the base station to indicate successful decoding of the one or more data packets using the computed LLR values of the base station when the evaluated first CRC is successful.

5. The method as claimed in claim 1, wherein the computed LLR values are combined with the LLR values of one or more intra base stations and LLR values of one or more inter base stations using a predefined weightage values which are based on long term SINR and instantaneous SINR values.

6. The method as claimed in claim 1, further comprising: transmitting one bit information to Cloud Radio Access Network (CRAN)/Virtual Radio Access Network (VRAN) associated with the base station to request for intra and inter LLR values.

7. A base station for hierarchical decoding of one or more data packets in a cellular communication system, the base station comprising:
   Log Likelihood Ratio (LLR) computing module configured to compute LLR values for decoding one or more data packets received from one or more User Equipments (UE) associated with the base station;
   Cyclic Redundancy Check (CRC) evaluation module configured to:
      evaluate the computed LLR values through a first CRC to determine whether the one or more data packets are successfully decoded,
      combine LLR values of one or more intra base stations, associated with the base station, with the computed LLR values for decoding the one or more data packets when at least one of Signal-to-Interference-plus-Noise Ratio (SINR) value of each of the one or more intra base stations is greater than a first predefined threshold and when the evaluated first CRC is unsuccessful,
      determine whether the one or more data packets are successfully decoded using the LLR values of the one or more intra base stations and the computed LLR values by evaluating through a second CRC,
      combine the LLR values of one or more intra base stations and LLR values of one or more inter base stations, associated with the base station, with the computed LLR values for decoding the one or more packets when at least one of SINR value of each of the one or more inter base stations is greater than a second predefined threshold and when the evaluated second CRC is unsuccessful, and
      determine whether the one or more packets are successfully decoded using the LLR values of the one or more intra base stations, LLR values of the one or more inter base stations and the computed LLR values by evaluating through a third CRC; and
   receiving module configured to receive redundant version of the one or more data packets from the UE for decoding when the evaluated third CRC is unsuccessful.

8. The base station as claimed in claim 7, wherein the base station is associated with a machine learning model which is trained to provide the first predefined threshold and second predefined threshold using one or more network parameters.

9. The base station as claimed in claim 8, wherein the first predefined threshold and the second predefined threshold is updated at predefined time intervals.

10. The base station as claimed in claim 7, further comprising: broadcasting module configured to broadcast a message to neighboring base stations associated with the base station to indicate successful decoding of the one or more data packets using the computed LLR values of the base station when the evaluated first CRC is successful.

11. The base station as claimed in claim 7, wherein the CRC evaluation module combines the computed LLR values with the LLR values of one or more intra base stations and LLR values of one or more inter base stations using a predefined weightage values which are based on long term SINR and instantaneous SINR values.

12. The base station as claimed in claim 7, wherein the one or more base stations are connected to Cloud Radio Access Network (CRAN)/Virtual Radio Access Network (VRAN), wherein the one or more base stations transmit one bit information to the CRAN/VRAN to request for intra and inter LLR values.

13. A method for hierarchical decoding of one or more data packets in a cellular communication system, the method comprising:
   receiving, by a base station in the cellular communication network, one or more data packets from a User Equipment (UE) for decoding the one or more data packets;
   computing, by the base station, Log Likelihood Ratio (LLR) values for decoding the one or more data packets;
   evaluating, by the base station, the computed LLR values through a Cyclic Redundancy Check (CRC);
   comparing the LLR values of neighboring base stations to be greater than a set threshold of SINR, if the CRC is unsuccessful;
   combining the computed LLR values of the base station with the LLR value of neighboring base stations; and
   attempting to decode the one or more data packet successfully by passing the CRC.

14. The method as claimed in claim 13, wherein the neighboring base stations comprise of intra and inter base stations wherein, post failure, the intra base station LLR values are combined with the original base station LLR values, wherein, post the failure of usage of original base station and intra base station LLR values, inter base station LLR values are combined with the original base station and intra base station LLR values wherein set threshold of SINR for both intra and inter base station is different.

15. The method as claimed in claim 13, wherein the set threshold of SINR are obtained from a machine learning model associated with the base station which is trained using one or more network parameters.

16. The method as claimed in claim 13, wherein based on location of the UE the one or more inter base stations may be selected for decoding of the one or more data packets using the machine learning model.

17. The method as claimed in claim 16, wherein the base station creates a map for each UE and its associated one or more inter base stations identified for the UE based on the UE location and function of Modulation Coding Scheme (MCS).

18. The method as claimed in claim 13, wherein the base station is associated with a machine learning model which is trained based on one or more network parameters associated with the UE to identify one or more inter and intra cells for decoding the one or more data packets.

19. A base station for hierarchical decoding of one or more data packets in a cellular communication system, the base station comprising:
   receiving module configured to receive one or more data packets from a User Equipment (UE) for decoding the one or more data packets;

Log Likelihood Ratio (LLR) computing module configured to compute LLR values for decoding the one or more data packets;

Cyclic Redundancy Check (CRC) evaluation module configured to:
- evaluate the computed LLR values through a CRC,
- compare the LLR values of neighboring base stations to be greater than a set threshold of SINR, if the CRC is unsuccessful, and
- combine the computed LLR values of the base station with the LLR value of neighboring base stations; and processor configured to attempt to decode the one or more data packet successfully by passing the CRC.

20. The base station as claimed in claim 19, wherein the neighboring base stations comprise of intra and inter base stations wherein, post failure, the base station combines intra base station LLR values with the original base station LLR values, wherein, post the failure of usage of original base station and intra base station LLR values, the base station combines inter base station LLR values with the original base station and intra base station LLR values wherein set threshold of SINR for both intra and inter base station is different.

* * * * *